(12) United States Patent  
Honda

(10) Patent No.: US 8,448,434 B2  
(45) Date of Patent: May 28, 2013

(54) SHAPE MEMORY ALLOY DRIVE DEVICE

(75) Inventor: Yasuhiro Honda, Takatsuki (JP)

(73) Assignee: Konica Minolta Opto, Inc., Tokyo (JP)

( * ) Notice: Subject to any disclaimer, the term of this patent is extended or adjusted under 35 U.S.C. 154(b) by 464 days.

(21) Appl. No.: 12/741,504

(22) PCT Filed: Nov. 11, 2008

(86) PCT No.: PCT/JP2008/070459  
§ 371 (c)(1),  
(2), (4) Date: May 5, 2010

(87) PCT Pub. No.: WO2009/063845  
PCT Pub. Date: May 22, 2009

(65) Prior Publication Data  
US 2010/0257859 A1    Oct. 14, 2010

(30) Foreign Application Priority Data  
Nov. 12, 2007    (JP) .................................. 2007-293479

(51) Int. Cl.  
*F03G 7/06* (2006.01)  
*H02N 10/00* (2006.01)

(52) U.S. Cl.  
USPC .................. 60/527; 60/528; 60/529; 359/824

(58) Field of Classification Search  
USPC .................................................... 60/547, 548  
See application file for complete search history.

(56) References Cited

U.S. PATENT DOCUMENTS

| 4,977,886 | A |   | 12/1990 | Takehana et al. |  |
|---|---|---|---|---|---|
| 5,685,149 | A | * | 11/1997 | Schneider et al. | ............... 60/528 |
| 6,434,932 | B2 | * | 8/2002 | Hara et al. | ...................... 60/527 |
| 6,516,146 | B1 | * | 2/2003 | Kosaka | ........................... 396/55 |

(Continued)

FOREIGN PATENT DOCUMENTS

| EP | 1 914 422 A1 | 4/2008 |
|---|---|---|
| EP | 1438503 | 4/2008 |

(Continued)

OTHER PUBLICATIONS

Ikuta, K.; , "Micro/miniature shape memory alloy actuator," Robotics and Automation, 1990. Proceedings., 1990 IEEE International Conference on , vol., no., pp. 2156-2161 vol. 3, May 13-18, 1990 doi: 10.1109/ROBOT.1990.126323 URL: http://ieeexplore.ieee.org/stamp/stamp.jsp?tp=&arnumber=126323&isnumber=3534.*

*Primary Examiner* — Thomas Denion  
*Assistant Examiner* — Todd Pleiness  
(74) *Attorney, Agent, or Firm* — Cozen O'Connor

(57) ABSTRACT

A shape memory alloy drive device has drive control portion for displacing a shape memory alloy up to a target displacement value by applying a voltage or an electric current to the shape memory alloy by servo control, and also has contact detection portion for detecting a predetermined change in a drive control value, or, for example, a sharp increase in the drive control value, representing the amount of the voltage of the electric current applied by the drive control portion. When detecting a predetermined change, the contact detection portion determines that a movable portion having a lens etc. mounted thereon is in contact with a stationary mechanism. The shape memory alloy drive device further has drive limiting portion which, when the determination described above is made, causes the drive control portion to limit the target displacement value within a predetermined range. This limits an electric current flowing when the movable portion makes contact with the stationary mechanism, preventing overheating and excess stress.

18 Claims, 9 Drawing Sheets

U.S. PATENT DOCUMENTS

| | | |
|---|---|---|
| 6,543,224 B1 * | 4/2003 | Barooah .................. 60/527 |
| 6,554,501 B2 | 4/2003 | Kosaka et al. |
| 6,574,958 B1 | 6/2003 | MacGregor |
| 6,981,374 B2 * | 1/2006 | von Behrens et al. ......... 60/527 |
| 7,650,752 B2 | 1/2010 | Oohara |
| 7,688,533 B2 | 3/2010 | Wada et al. |
| 7,823,383 B2 | 11/2010 | Noda et al. |
| 7,953,319 B2 | 5/2011 | Tanimura et al. |
| 8,068,167 B2 | 11/2011 | Honda et al. |
| 2001/0002226 A1 | 5/2001 | Tanaka et al. |
| 2001/0025477 A1 | 10/2001 | Hara et al. ................. 60/39.02 |
| 2001/0026687 A1 | 10/2001 | Kosaka et al. |
| 2001/0038418 A1 | 11/2001 | Suda et al. |
| 2002/0109784 A1 | 8/2002 | Suda et al. |
| 2002/0113499 A1 | 8/2002 | Von Behrens et al. |
| 2004/0261411 A1 | 12/2004 | MacGregor |
| 2006/0048511 A1 * | 3/2006 | Everson et al. ............... 60/527 |
| 2006/0148296 A1 * | 7/2006 | Zanella et al. ............... 439/310 |
| 2006/0162332 A1 * | 7/2006 | Klaffenbach et al. ......... 60/527 |
| 2007/0103555 A1 | 5/2007 | Eromaki |
| 2007/0175213 A1 * | 8/2007 | Featherstone et al. ......... 60/527 |
| 2009/0009656 A1 | 1/2009 | Honda et al. |
| 2010/0045214 A1 | 2/2010 | Matsuki |
| 2010/0257859 A1 | 10/2010 | Honda |
| 2010/0293940 A1 | 11/2010 | Noda et al. |
| 2010/0296183 A1 | 11/2010 | Honda et al. |
| 2010/0320943 A1 | 12/2010 | Honda |

FOREIGN PATENT DOCUMENTS

| | | |
|---|---|---|
| JP | 02-266312 | 10/1990 |
| JP | 06-114003 | 4/1994 |
| JP | 2000-112526 | 4/2000 |
| JP | 2000-122124 | 4/2000 |
| JP | 2001-264841 A | 9/2001 |
| JP | 2006-189045 A | 7/2006 |
| JP | 2006-283575 | 10/2006 |
| JP | 2006-329146 | 12/2006 |
| JP | 2007-46561 A | 2/2007 |
| JP | 2007-57581 A | 3/2007 |
| JP | 2007-78954 A | 3/2007 |
| JP | 2007-153077 | 6/2007 |
| JP | 2007-333792 A | 12/2007 |
| KR | 10-2008-0035602 A | 4/2008 |
| WO | WO 02/068820 | 9/2002 |
| WO | WO 2007/018086 A1 | 2/2007 |
| WO | WO 2009/063845 A1 | 5/2009 |
| WO | WO 2009/090960 | 7/2009 |

* cited by examiner

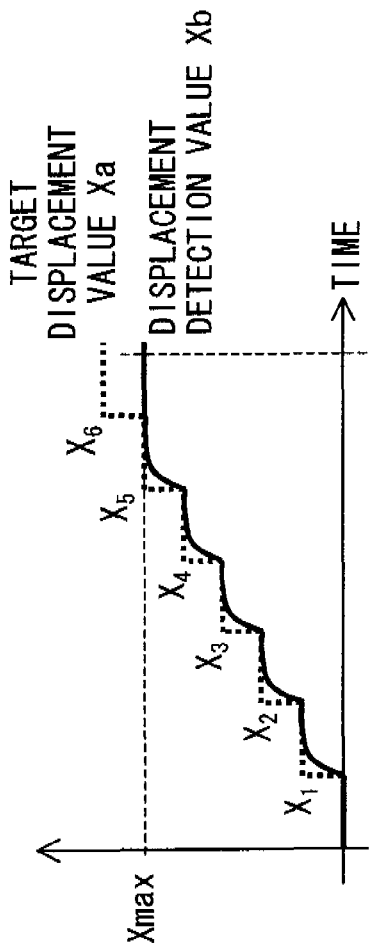
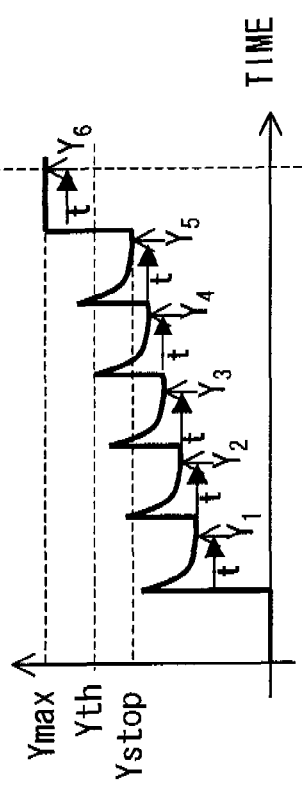
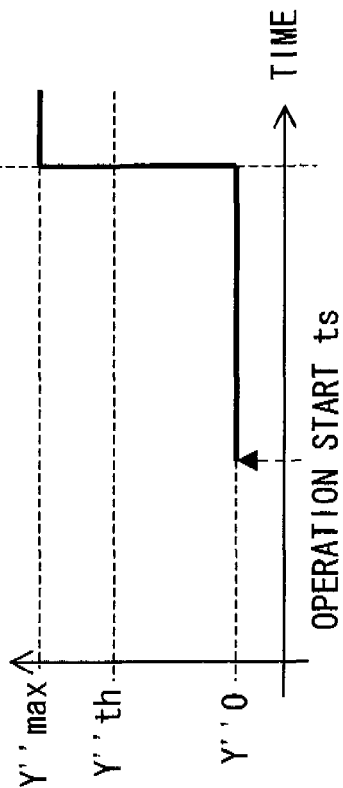
FIG. 8A
FIG. 8B
FIG. 8C

SHAPE MEMORY ALLOY DRIVE DEVICE

This is a U.S. National Phase under 35 U.S.C. §371 of International Application No. PCT/JP2008/070459, filed in the Japanese Patent Office on Nov. 11, 2008, which claims priority on Japanese Patent Application No. 2007-293479, filed Nov. 12, 2007.

TECHNICAL FIELD

The present invention relates to a shape memory alloy drive device that drives a movable portion by using a shape restore behavior of a shape memory alloy, and more particularly, to a shape memory alloy drive device that is capable of preventing deterioration of a shape memory alloy and breakdown of a movable portion due to overheat and excessive stress.

BACKGROUND ART

In image take apparatuses such as a digital camera and the like, practical use of a shape memory alloy actuator (=shape memory alloy dive device) that performs a lens movement by using a shape memory alloy is studied. A shape memory alloy shrinks when heated by a voltage or a current applied thereto. Besides, a shape memory alloy stretches by radiating heat. Accordingly, by connecting a movable portion such as a lens unit or the like to one end of a shape memory alloy, applying a voltage or a current to it, and performing servo control of the amount of a flowing current (hereinafter, called "drive control value"), it is possible to perform focusing and the like.

In a shape memory alloy actuator that is controlled in displacement by a servo as described above, to raise response, a loop gain is set in such a way that a drive control value in a transient period of a displacement change becomes large. Accordingly, if a movable portion comes into contact with a stationary mechanism such as a stopper or the like to fail to reach a target displacement, a large drive control value is maintained and a large current continues to flow.

As a result of this, the shape memory alloy continues to be heated and an excessive stress is generated. There are problems that because of this overheating and excessive stress, characteristics of the shape memory alloy deteriorate and part of the shape memory alloy actuator breaks down.

In connection with the above problems, a patent document 1 discloses an actuator that includes a sensor portion that detects an excessive stress which exceeds a predetermined threshold value is used for a shaft-direction load that acts on a shape memory member.
[patent document 1]: JP-A-2006-189045

DISCLOSURE OF THE INVENTION

Problems to be Solved by the Invention

However, the invention disclosed in the patent document 1 detects and avoid an excessive stress acting on a shape memory alloy by using a sensor. Because of this, it is necessary to mount an additional dedicated sensor, which is unfavorable in terms of size reduction and cost.

In light of the above points, an object of the present invention is, in a shape memory alloy actuator that drives a movable portion by using a shape restoring behavior of a shape memory alloy, to provide a shape memory alloy drive device that detects overheating and an excessive stress of the shape memory alloy quickly and correctly, thereby preventing deterioration and breakdown.

Means for Solving the Problem

To achieve the above object, a shape memory alloy drive device according to the present invention, which has a drive control portion that is given a target displacement value, displaces a shape memory alloy to the target displacement value as a target by applying a voltage or a current to the shape memory alloy, thereby performing drive control of a movable portion that is connected to the shape memory alloy, includes: a contact detection portion that based on a change in a drive control value which indicates a magnitude of the voltage or the current applied by the drive control portion, determines whether the movable portion is in contact with a stationary mechanism or not; and a drive limit portion that limits an upper limit of the target displacement value given to the drive control portion if contact is detected based on a determination result from the contact detection portion.

According to this structure, the shape memory alloy drive device according to the present invention includes the drive control portion that applies a voltage or current to a shape memory alloy by serve control, and displaces the shape memory alloy to the target displacement value as a target. The drive control portion detects a resistance value of the shape memory alloy, and from the detected resistance value, calculates a displacement that occurs in the shape memory alloy. And, the servo control for changing the drive control value is performed until the calculated displacement reaches the target displacement. By stretching and shrinking the shape memory alloy in this way, drive control of the movable portion, for example, a lens unit or the like connected to the shape memory alloy is performed.

In addition, included is the contact detection portion that detects a predetermined change in the drive control value, which indicates the amount of a voltage or a current applied by the drive control portion, for example, a sharp increase in the drive control value and the like. The contact detection portion detects the predetermined change to determine that the movable portion having a lens and the like comes into contact with a stationary mechanism. Besides, included is a drive limit portion that limits the target displacement value given to the drive control portion to a predetermined range when the determination is performed. According to this, the voltage or the current that is applied when the movable portion comes into contact with the stationary mechanism is limited to prevent overheating and an excessive stress.

Besides, in the shape memory alloy drive device according to the present invention, the contact detection portion sets a reference drive value between a first drive control value that is a drive control value at which the movable portion and the stationary portion are assumed to come into contact with each other and a second drive control value that is a maximum drive control value controllable by the drive control portion; and determines that the movable portion comes into contact with the stationary mechanism if the drive control value of the drive control portion exceeds the reference drive value.

According to this structure, to determine that the movable portion comes into contact with the stationary mechanism, the reference drive value is set. First, set is the first drive control value that is a drive control value at which the movable portion and the stationary mechanism are assumed to come into contact with each other. Here, the value of the first drive control value changes depending on environment temperature and a material of the shape memory alloy. Accordingly, it is desirable to perform an inspection in a standard environment to obtain the value in advance.

In addition, the second drive control value for indicating the maximum drive control value controllable by the drive control portion is set. A limit of this is decided on in advance depending on characteristics of a circuit and the like. The reference drive value is set between the first drive control value and the second drive control value. The contact detection portion monitors the drive control value of the drive control portion, and determines that the movable portion comes into contact with the stationary mechanism if the drive control value exceeds the reference drive value. As a result of this, the drive control value is limited by the drive limit portion.

Besides, the shape memory alloy drive device according to the present invention includes a differential portion that time-differentiates the drive control value from the drive control portion and gives the calculated differential value to the contact detection portion; wherein the contact detection portion sets a value, which is lower than a maximum differential value that is a differential value at which the drive control value is changed largest by the drive control portion, as a reference differential value; and determines that the movable portion comes into contact with the stationary mechanism if the differential value given from the differential portion exceeds the reference differential value.

According to this structure, included is the differential portion that time-differentiates the drive control value from the drive control portion which changes with time and gives the calculated differential value to the contact detection portion. And, to determine that the movable portion comes into contact with the stationary mechanism, the reference value for the differential value is set. First, the maximum amount of change per time in the drive control value that is controllable by the drive control portion is differentiated and is set as the maximum differential value. Here, because a limit of the maximum change amount per time is decided on in advance depending on characteristics of the circuit and the like, it is possible to obtain the maximum differential value from the limit amount.

In addition, a value lower than the maximum differential value, for example, a 90% value of the maximum differential vale is set as the reference differential value. The contact detection portion monitors the differential value output from the differential portion, and determines that the movable portion comes into contact with the stationary mechanism if the differential value exceeds the reference differential value. As a result of this, the drive control value is limited by the drive limit portion.

Besides, the shape memory alloy drive device according to the present invention includes a target displacement specification portion that changes the target displacement value of the shape memory alloy in a stepwise fashion and gives the changed target displacement value to the drive limit portion; wherein the contact detection portion sets a reference drive value between the first drive control value at which the movable portion and the stationary mechanism are assumed to come into contact with each other and the second drive control value that is the maximum drive control value controllable by the drive control portion; compares the drive control value after an elapse of a setting time and the reference drive value when the drive control value from the drive control portion changes in response to a change in the target displacement value from the target displacement specification portion; and determines that the movable portion comes into contact with the stationary mechanism if the drive control value exceeds the reference drive value.

According to this structure, included is the target displacement specification portion that changes the target displacement value for the shape memory alloy in the stepwise fashion and gives the changed target displacement value to the drive control portion. Besides, to determine that the movable portion comes into contact with the stationary mechanism, the reference drive value is set. Because the way of setting the reference drive value is the same as that in the claim 2, description of it is skipped here. If the target displacement value is changed by the target displacement specification portion, the drive control portion changes the drive control value in accordance with a new target displacement value.

At this time, the contact detection portion compares the drive control value after an elapse of the setting time and the reference drive value. And, it is determined that the movable portion comes into contact with the stationary mechanism if the drive control value after the elapse of the setting time exceeds the reference drive value. As a result of this, the drive control value is limited by the drive control portion.

Besides, the shape memory alloy drive device according to the present invention includes: a target displacement specification portion that changes the target displacement value of the shape memory alloy in a stepwise fashion and gives the changed target displacement value to the drive control portion; and a difference calculation portion that records the drive control value after an elapse of a setting time when the drive control value from the drive control portion changes in response to a change in the target displacement value from the target displacement specification portion; and calculates a difference value between the drive control value at a time of the recording and the drive control value at a previous recoding time; wherein the contact detection portion sets a value, which is lower than a maximum difference value that is a difference value at which the drive control value is changed largest by the drive control portion, as a reference difference value; and determines that the movable portion comes into contact with the stationary mechanism if the difference value given from the difference calculation portion exceeds the reference difference value.

According to this structure, included is the target displacement specification portion that changes the target displacement value of the shape memory alloy in the stepwise fashion and gives the changed target displacement value to the drive limit portion. Besides, included is the difference calculation portion that records the drive control value after an elapse of the setting time when the drive control value from the drive control portion changes in response to a change in the target displacement value, and calculates a difference value between the drive control value recorded at a previous time and the drive control value recorded this time. Besides, to determine whether the movable portion comes into contact with the stationary mechanism, a reference difference value is set.

First, at a time of the maximum change in the drive control value caused by the drive control portion, a difference value between the value before the change and the value after the change is calculated as the maximum difference value. Here, because a limit of the maximum change amount per time in the drive control value is decided on in advance depending on characteristics of the circuit and the like, it is also possible to obtain the maximum difference value from the limit amount. And, a value lower than the maximum differential value, for example, a 90% value of the maximum differential vale is set as the reference difference value. The contact detection portion monitors the difference value output from the difference calculation portion, and determines that the movable portion comes into contact with the stationary mechanism if the difference value exceeds the reference difference value. As a result of this, the drive control value is limited by the drive limit portion.

Besides, the shape memory alloy drive device according to the present invention includes a difference record portion that records a difference between a first target displacement value at which the movable portion and the stationary mechanism are assumed to come into contact with each other and a second target displacement value for moving the movable portion to a predetermined standby position; wherein a displacement at which contact between the movable portion and the stationary mechanism is detected by the contact detection portion is used as a reference displacement, and a target displacement value of the standby position is decided on based on the reference displacement and the difference recorded in the difference record portion.

According to this structure, included is the difference record portion that records a difference between the first target displacement value at which the movable portion and the stationary mechanism are assumed to come into contact with each other and the second target displacement value for moving the movable portion to the predetermined standby position. At a start time of a power supply of an image take apparatus, control is performed in such a way that the movable portion moves to a movable limit and returns to the standby position.

At this time, at the movable limit, if contact between the movable portion and the stationary mechanism is detected by the contact detection portion, the displacement at the contact position is obtained as the reference displacement. And, by using the reference displacement and the difference, for example, by subtracting the difference from the reference displacement, the target displacement value for the standby position is decided on. And, by increasing or decreasing the drive control value in accordance with the target displacement value, the drive control for the standby position is performed.

Besides, the shape memory alloy drive device according to the present invention includes a displacement detection portion that detects a displacement that occurs in the shape memory alloy; wherein the drive control portion performs control to change the drive control value in such a way that the displacement obtained by the displacement detection portion becomes equal to the target displacement value.

According to this structure, the shape memory alloy drive device according to the present invention includes the displacement detection portion that detects a displacement that occurs in the shape memory alloy. And, the drive control portion performs control to change the drive control value in such a way that the displacement obtained by the displacement detection portion becomes equal to the target displacement value.

Advantages of the Invention

According to the present invention, if the drive control value sharply changes, it is determined that the movable portion is in contact with the stationary mechanism, and the target displacement value is limited. Because of this, it is possible to obtain a margin for the contact detection wider than that in a case where the contact detection is performed by using a change in a displacement detection value that has a relatively slow change. Accordingly, it is possible not only to reduce the possibility of an erroneous contact detection, but also to prevent deterioration of the shape memory alloy due to overheating and an excessive stress of the shape memory alloy, and breakdown of the movable portion and the like with high accuracy.

Besides, according to the present invention, if the drive control value exceeds the reference drive value, it is determined that the movable portion comes into contact with the stationary mechanism, and the drive control value is limited. In the shape memory alloy drive device that is controlled in displacement by a servo, the loop gain of the servo is set large to raise the response. Accordingly, by using the drive control value, it is possible to detect a change easily and at a high speed with large detection sensitivity and response speed. In this way, it is possible to detect contact in a short time and prevent overheating and an excessive stress of the shape memory alloy.

Besides, according to the present invention, if the differential value of the drive control value exceeds the reference differential value, it is determined that the movable portion comes into contact with the stationary mechanism, and the drive control value is limited. According to this, even if the environment temperature changes and an absolute value of the drive control value for the shape memory alloy changes, the change in the differential value is relatively small, accordingly, it is possible to perform a stable determination that is unlikely to be influenced by the environment temperature. Besides, it is not necessary to set a large reference differential value for avoidance of an erroneous determination. Because of this, it is possible to prevent the heating amount from becoming relatively large until the determination on an increase over the reference differential value is performed.

Besides, according to the present invention, in a case where the target displacement value changes in a stepwise fashion, the contact detection is performed by using the drive control value after the setting time elapses. As described above, because the determination is performed by using the drive control value after the setting time elapses, it is possible to avoid an erroneous determination due to a change in the drive control value immediately after a change in the target displacement value.

Besides, according to the present invention, in a case where the target displacement value changes in a stepwise fashion, the contact detection is performed by using the difference value of the drive control value after the setting time elapses. According to this, like in the case where the differential value is used, it is possible to perform a stable determination that is unlikely to be influenced by the environment temperature. Besides, because it is not necessary to set a large reference difference value for avoidance of an erroneous determination, it is possible to prevent the heating amount from becoming relatively large.

Besides, according to the present invention, the displacement at the time contact is detected by using the drive control value is used as the reference displacement, and the target displacement value for the standby position is decided on based on the reference displacement. Because of this, even in a case where an absolute displacement changes because of temperature change, time-dependent change and the like of the shape memory alloy, it is possible to decide on the standby position of the movable portion relatively correctly by using the position of the stationary mechanism at which the contact is detected as the reference. As described above, because it is possible to always maintain the same standby position, it is possible to raise operability and convenience for users.

BRIEF DESCRIPTION OF THE DRAWINGS

FIG. 8A, FIG. 8B, and FIG. 8C are graphs showing a displacement, a drive control value and a difference value in the drive control value in the third embodiment.

LIST OF REFERENCE SYMBOLS 100 shape memory alloy actuator (shape memory alloy drive device)
1 shape memory alloy
5 movable portion
7 stopper (stationary mechanism)
10 microcomputer (contact detection portion, drive limit portion, target displacement specification portion, difference calculation portion)
11 servo control drive circuit (drive control portion)
12 comparator (contact detection portion)
13 target displacement value limit circuit (drive limit portion)
14 differentiator (differential portion)

BEST MODE FOR CARRYING OUT THE INVENTION

Hereinafter, the embodiments of the present invention are described with reference to the drawings. The embodiments shown here are examples and the present invention is not limited to the embodiments shown here.

EMBODIMENT 1

1-1. Internal Structure

Figure 1:
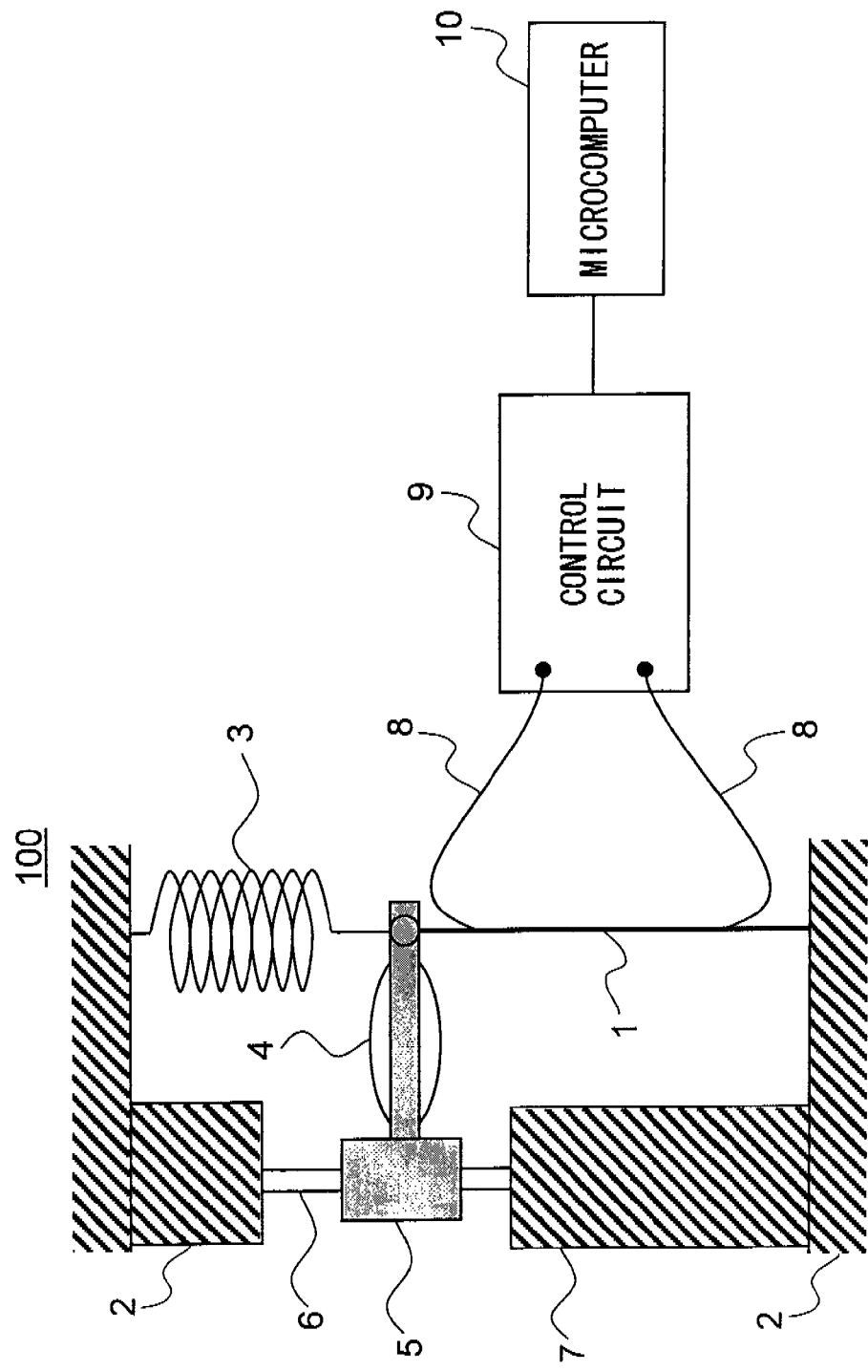
FIG. 1 is a structural view showing a shape memory alloy drive device according to the present invention.

FIG. 1 is a structural view showing a shape memory alloy actuator 100 (=shape memory alloy drive device) according to a first embodiment of the present invention. The shape memory alloy actuator 100 includes a shape memory alloy 1, a stationary portion 2, a bias spring 3, a lens 4, a movable portion 5, a guide shaft 6, a stopper 7 (=stationary mechanism), a line 8 and a control circuit 9. Besides, a microcomputer 10 exists as a device connected to the control circuit 9.

The shape memory alloy 1 that has a line-material shape includes one end mounted on the stationary portion 2 and the other end mounted on the movable portion 5. Besides, the bias spring 3 includes one end mounted on the stationary portion 2 and the other end mounted on a side of the movable portion 5 opposite to the shape memory alloy 1. Accordingly, the bias spring 3 gives a stress in a direction for pulling the movable portion 5 and the shape memory alloy 1.

The movable portion 5 is equipped with the lens 4 and a movable shaft of the movable portion 5 is defined by the guide shaft 6. Besides, the stopper 7 limits a movable area of the movable portion 5 when the shape memory alloy 1 shrinks by being heated. In the above structure, when the shape memory alloy 1 shrinks and freezes by being heated, the bias spring 3 stretches. Besides, when the shape memory alloy 1 radiates heat to become flexible, the shape memory alloy 1 is stretched by the stress of the bias spring 3. In this way, the movable portion 5 on which the lens 4 is placed moves.

Both ends of the shape memory alloy 1 are connected to the control circuit 9 by the line 8 and it is possible to apply a voltage or current. The control circuit 9 includes a resistance value detection portion (not shown) that detects a resistance value of the shape memory alloy 1. Based on a detected resistance value, the control circuit 9 calculates a displacement that occurs in the shape memory alloy 1. Here, a correlation between the displacement and the resistance value is investigated in advance and stored in a record portion (not shown) or inside the control circuit 9 or the like. Here, in the above description, the resistance value detection is used for the displacement detection, the displacement detection portion is not limited to this and another portion may be used if it is possible to detect a displacement of the shape memory alloy or of the movable portion.

The microcomputer 10 gives a target displacement value that indicates a displacement needed to move the movable portion 5 to a target position. The control circuit 9 performs servo control to change the amount of a flowing current (=drive control value) in such a way that the given target displacement value is obtained. Specifically, a displacement is detected based on a resistance value detected by the resistance value detection portion, and the detections of a displacement and an increase in the drive control value are repeated until the detected displacement value and the target displacement value become equal to each other. In this way, it is possible to perform the drive control in such a way that the movable portion 5 moves to the target position.

Figure 2:
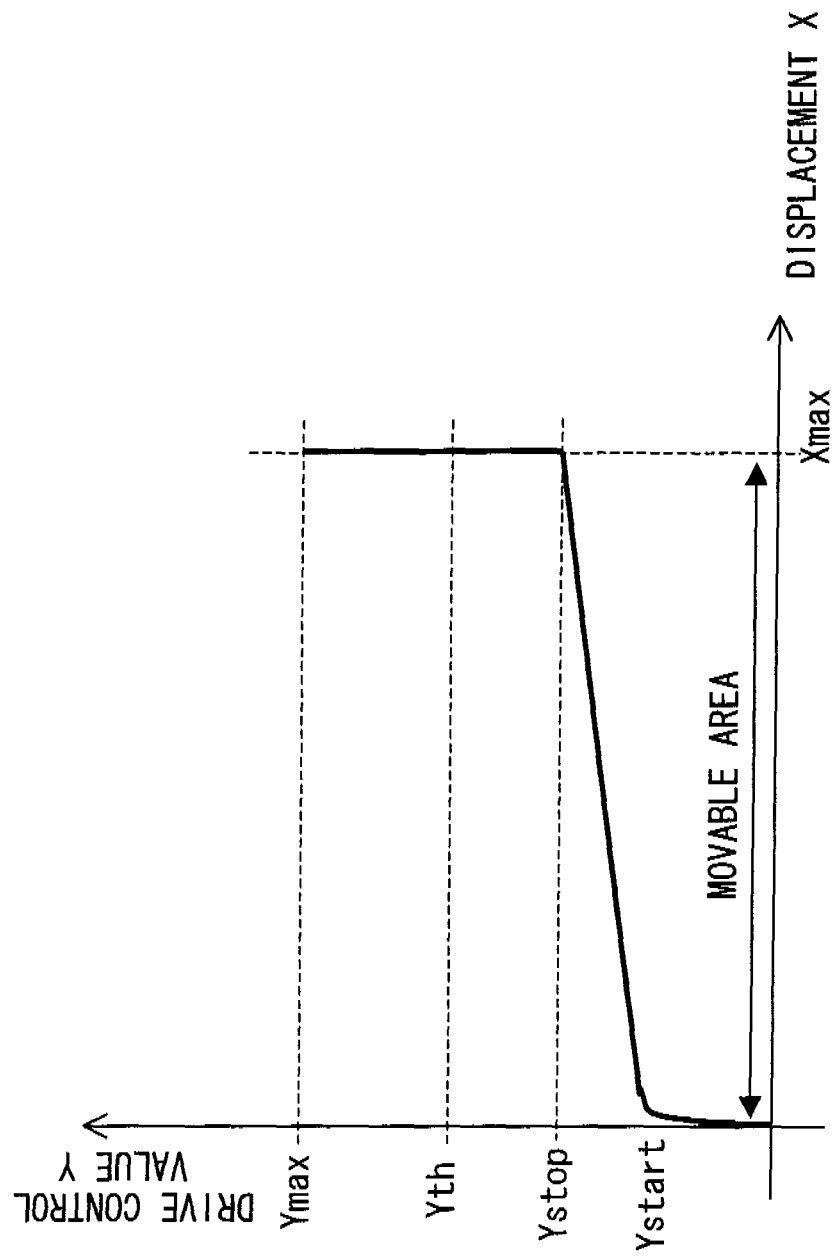
FIG. 2 is a graph showing a relationship between a displacement of a shape memory alloy and a drive control value.

FIG. 2 is a graph showing a relationship between a drive control value Y in the control circuit 9 and a displacement X that occurs in the shape memory alloy 1 in accordance with the drive control value Y. The control circuit 9 uses a large loop gain to raise drive response. In this case, the drive control value Y is controlled to increase until the target displacement is reached. As the drive control value Y increases, the displacement X also increases.

Xmax (=first target displacement value) in the figure indicates the displacement X at a time point the operation of the movable portion 5 is limited by the stopper 7. Besides, the drive control value Y corresponding to Xmax is Ystop (=first drive control value). Here, the values of Xmax and Ystop change depending on a material of the shape memory alloy 1 and environment temperature. In a case where the target displacement is not reached even at a time point the displacement X becomes Xmax, the drive control value Y sharply increases. And, the drive control value becomes Ymax, which is the maximum value that is able to be output from the control circuit 9, to reach saturation.

In the present invention, as shown in FIG. 2, a threshold value Yth (=reference drive value) is set between Ystop and Ymax. Here, it is possible to suitably change the value of Yth in accordance with an operation type if it is between Ystop and Ymax; however, because the closer Yth is to Ystop, the higher the possibility of an erroneous detection becomes, it is desirable that Yth is a value (e.g., a 90% value of Ymax) close to Ymax.

1-2. Control Circuit Structure

Figure 3:
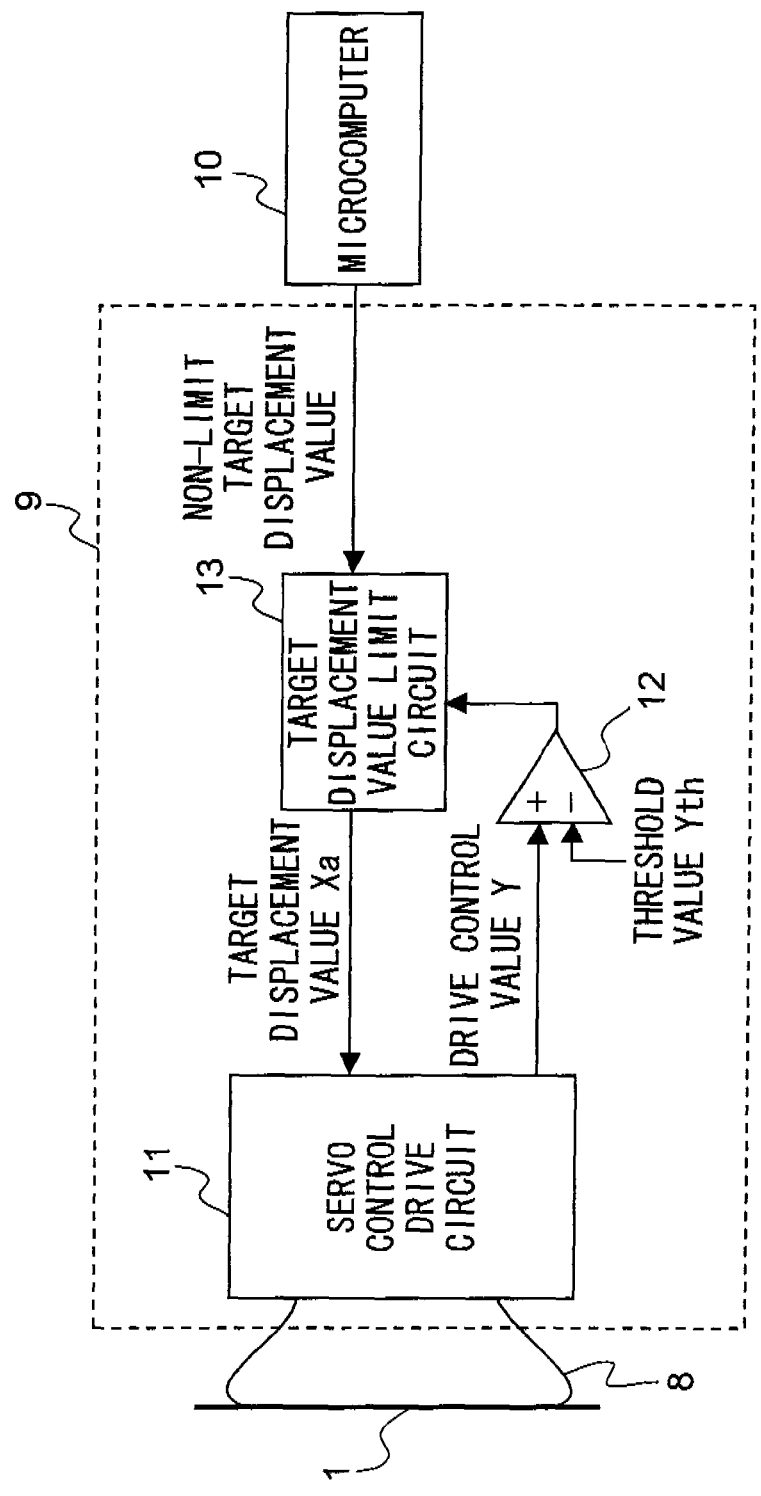
FIG. 3 is a block diagram showing a structure of a control circuit according to a first embodiment.

FIG. 3 is a block diagram showing details of the control circuit 9 according to the first embodiment of the present invention. The control circuit 9 includes a servo control drive circuit 11 (=drive control portion), a comparator 12 (=contact detection portion) and a target displacement value limit circuit 13 (=drive limit portion). Besides, the target displacement value limit circuit 13 is connected to the microcomputer 10 and given a non-limit target displacement value from the microcomputer 10.

The servo control drive circuit 11 controls the drive control value Y in such a way that a target displacement value Xa input from the target displacement value limit circuit 13 and the displacement of the shape memory alloy 1 become equal to each other. Besides, the servo control drive circuit 11 gives the value of the drive control value Y that is used to the comparator 12.

The comparator 12 monitors whether the drive control value Y in a time of the drive control of the shape memory alloy 1 exceeds Yth or not. Specifically, the drive control value Y given from the servo control drive circuit 11 and the predetermined threshold value Yth are compared with each other. If it is determined that the drive control value Y exceeds the threshold value Yth, the comparator 12 gives a limit signal to the target displacement vale limit circuit 13.

The target displacement vale limit circuit 13 that receives the limit signal gives thereafter a predetermined target displacement value to the servo control drive circuit 11 regardless of the value of the non-limit target displacement value given from the microcomputer 10. In this way, an upper limit of the target displacement value Xa is limited.

Figure 4:
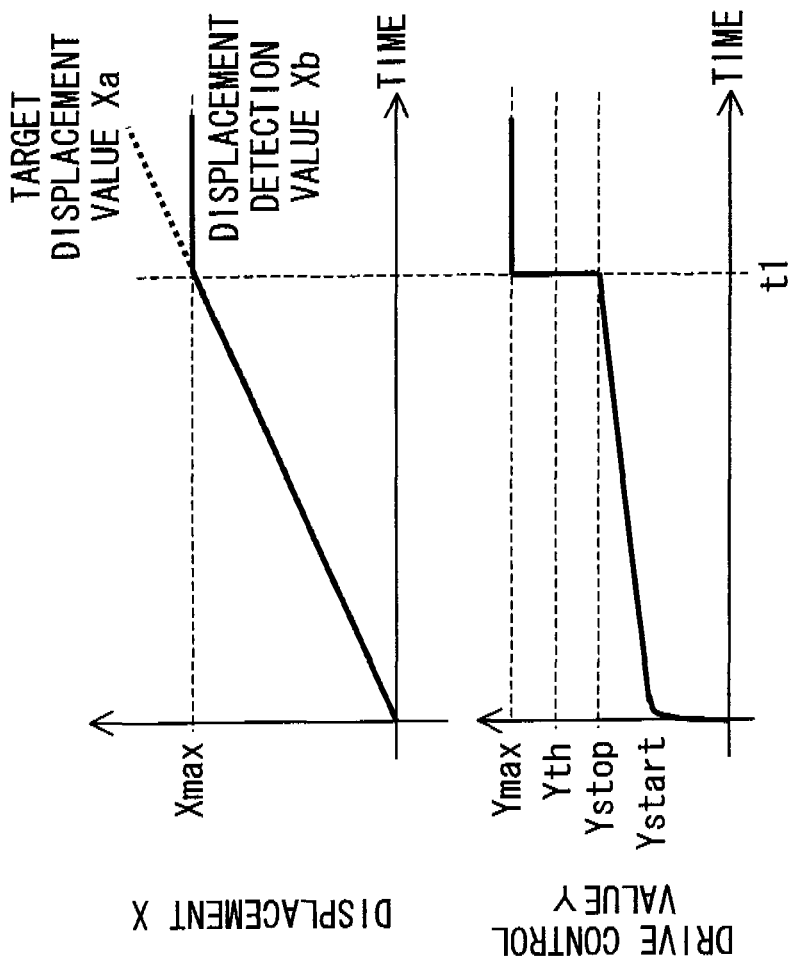
FIG. 4A and FIG. 4B are graphs showing a displacement and a change in a drive control value in the first embodiment.

Operation waveforms of the control circuit 9 having the above structure are shown in FIG. 4. In FIG. 4, a lateral axis indicates elapse time. FIG. 4 (a) shows changes in the target displacement value Xa and the displacement detection value Xb corresponding to the elapse time; and FIG. 4 (b) shows a change in the drive control value Y corresponding to the elapse time. Here, the displacement detection value Xb is detected by the resistance value detection portion (not shown) that the control circuit 9 includes.

When the drive process of the movable portion 5 is started, the target displacement value Xa increases with time. Then, the servo control drive circuit 11 increases the drive control value Y in such a way that the target displacement value Xa and the displacement detection value Xb become equal to each other. The drive control value Y soon becomes Ystop at the time point of Xmax. At this time point, the movable portion 5 comes into contact with the stopper 7.

Then, the displacement detection value Xb becomes unable to follow the target displacement value Xa. Here, the servo control drive circuit 11 increases the drive control value Y to Ymax. Accordingly, by setting the threshold value Yth under a condition "Ystop<Yth<Ymax," and comparing the drive control value Y and Yth by using the comparator 12, it is determined whether the movable portion 5 comes into contact with the stopper 7 or not.

As described above, because the contact determination is performed by using the drive control value Y, it is possible to perform the determination easily and at high speed. Besides, as for the change before and after the time point (=broken line t1 in the figure) of the contact of the movable portion 5, the change in the drive control value Y is much larger than the change in the displacement detection value Xb. Accordingly, there is an advantage that it is possible to widen a detection margin in detecting the change.

EMBODIMENT 2

2-1. Internal Structure

Because the internal structure is the same as that in the embodiment 1, description of it is skipped.

2-2. Control Circuit Structure

Figure 5:
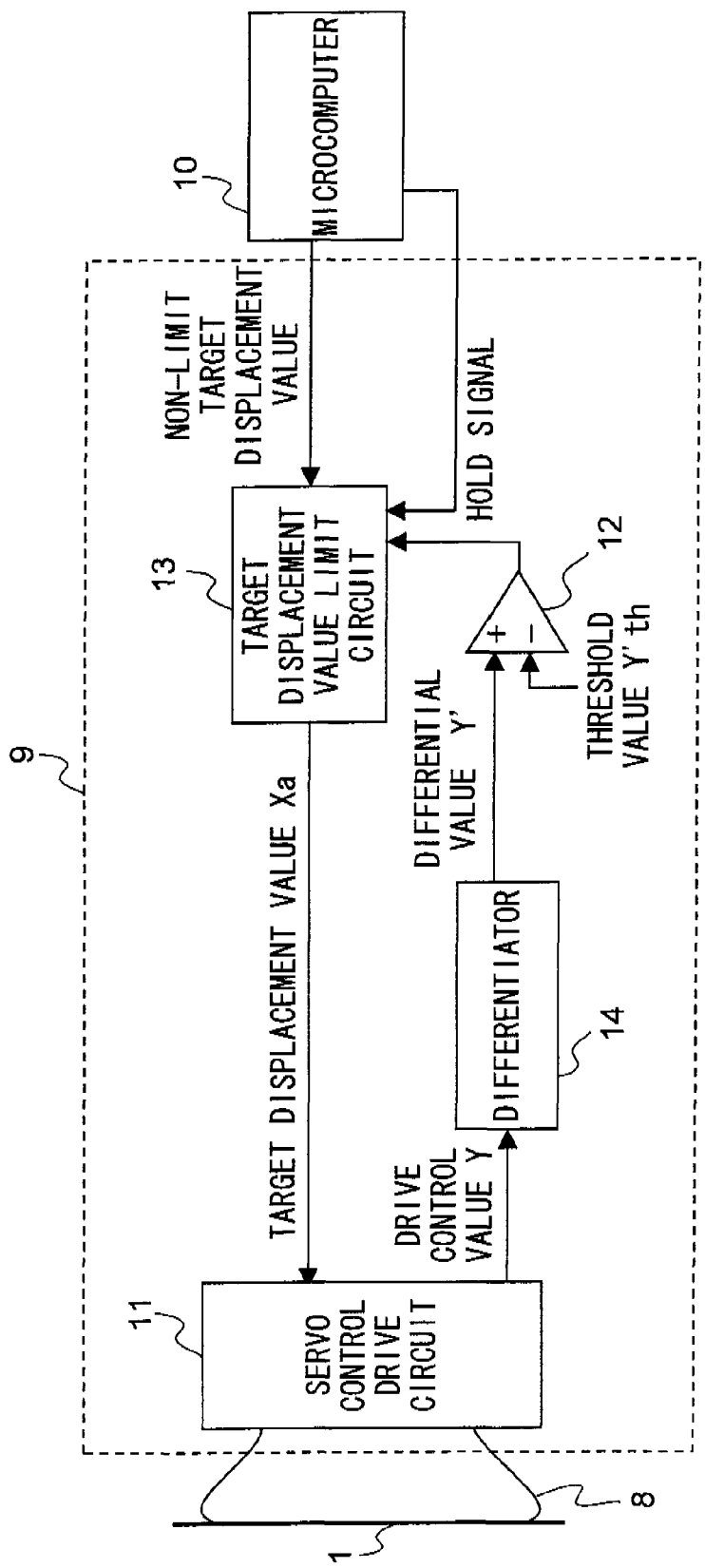
FIG. 5 is a block diagram showing a structure of a control circuit according to a second embodiment.

Here, details of the control circuit 9 according to a second embodiment of the present invention are described by using a block diagram in FIG. 5. Here, identical components to those in the embodiment 1 are indicated by identical reference numbers and description of them is skipped.

The control circuit 9 in the present embodiment includes a differentiator 14 (=differential portion) besides the servo control drive circuit 11, the comparator 12 and the target displacement limit circuit 13 in the embodiment 1. Besides, the target displacement value limit circuit 13 receives a hold signal from the microcomputer 10.

The servo control drive circuit 11 controls the drive control value Y in such a way that the target displacement value Xa input from the target displacement value limit circuit 13 and the displacement of the shape memory alloy 1 become equal to each other. Besides, the servo control drive circuit 11 gives the value of the drive control value Y to the differentiator 14. The differentiator 14 time-differentiates the drive control value Y given from the servo control drive circuit 11 to calculate a differential value Y'. And, the calculated differential value Y' is given to the comparator 12.

The comparator 12 monitors whether the differential value Y' in a time of the drive control of the shape memory alloy 1 exceeds a threshold value Y'th (=reference differential value) or not. Specifically, the differential value Y' given from the differentiator 14 and the predetermined threshold value Y'th are compared with each other. If it is determined that the differential value Y' exceeds the threshold value Y'th, the comparator 12 gives a limit signal to the target displacement vale limit circuit 13.

The target displacement vale limit circuit 13 that receives the limit signal gives thereafter a predetermined target displacement value to the servo control drive circuit 11 regardless of the value of the non-limit target displacement value given from the microcomputer 10. In this way, the upper limit of the target displacement value Xa is limited. Here, if the limit signal from the comparator 12 is asserted, the target displacement vale limit circuit 13 changes the limit value, while even if the limit signal is negated, the limit value is held. Besides, it is also possible to hold the target displacement value limit circuit 13 for a predetermined time.

Figures 6A, 6B, 6C:
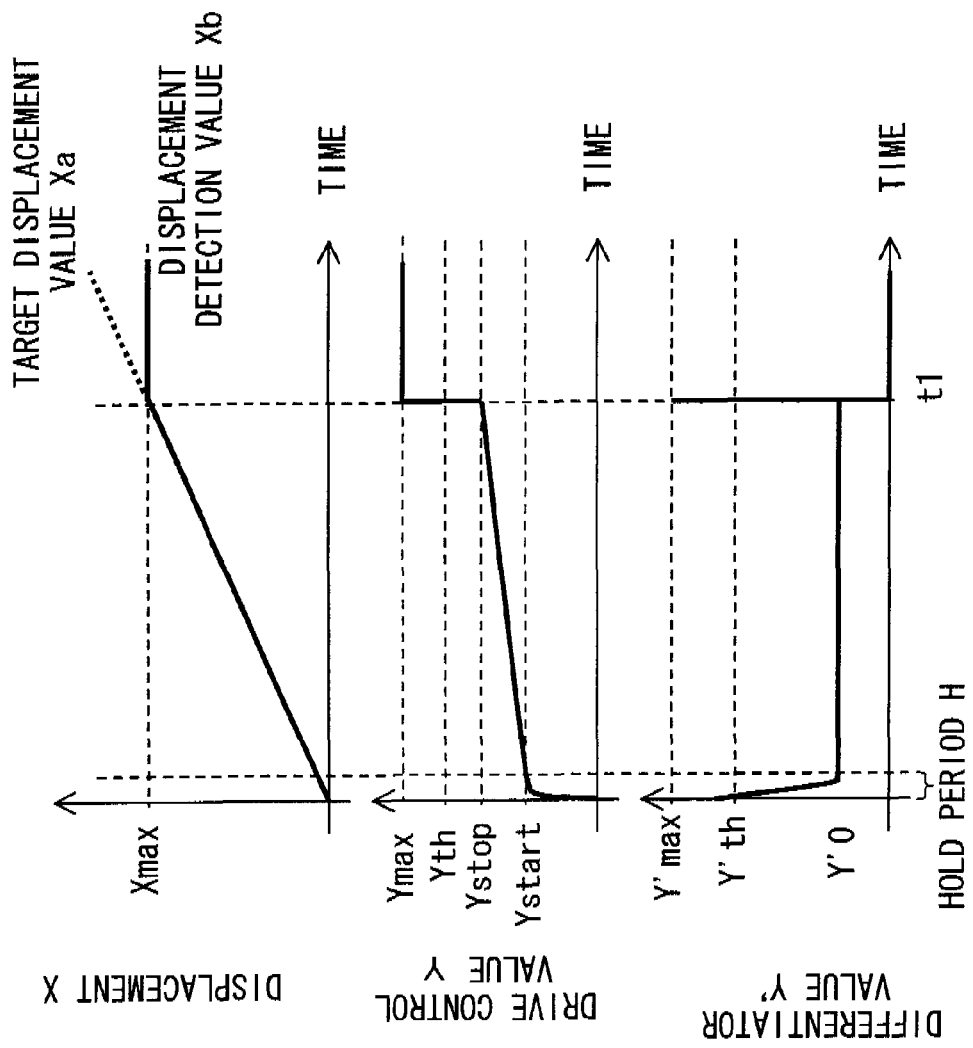
FIG. 6A, FIG. 6B, and FIG. 6C are graphs showing a displacement, a drive control value and a differential value in the drive control value in the second embodiment.

Operation waveforms of the control circuit 9 having the above structure are shown in FIG. 6. FIGS. 6 (a) and 6 (b) are the same as FIGS. 4 (a) and 4 (b) in the embodiment 1. FIG. 6 (c) shows a change in the differential value Y' corresponding to the elapse time.

When the drive process of the movable portion 5 is started and the target displacement value Xa increases with time, the servo control drive circuit 11 increases the drive control value Y in such a way that the target displacement value Xa and the displacement detection value Xb become equal to each other. Here, because the amount of a change in the drive control value Y is relatively small, the differential value Y' obtained by time-differentiating the drive control value Y keeps an approximate value of Y'0.

The drive control value Y becomes Ystop at the time point of Xmax. At this time point, the movable portion 5 comes into contact with the stopper 7. Then, the displacement detection value Xb becomes unable to follow the target displacement value Xa. Here, the servo control drive circuit 11 increases the drive control value Y to Ymax. As a result of this, because the drive control value Y increases sharply, the differential value Y' increases to Y'max (=maximum differential value). Accordingly, by setting the threshold value Y'th under a condition "Y'0<Y'th<Y'max" and comparing Y' and Y'th, it is determined whether the movable portion 5 comes into contact with the stopper 7 or not.

Here, because the drive control value Y changes sharply in a time zone in the vicinity of the time the displacement X is 0, the differential value Y' is likely to exceed the threshold value Y'th. Accordingly, a hold period H is set for a predetermined time after the start of the process. In the hold period H, the microcomputer 10 gives a hold signal to the target displacement value limit circuit 13. During receiving the hold signal, the target displacement value limit circuit 13 does not respond to the limit signal transmitted from the comparator 12. Here, Ystart in FIG. 6 (b) indicates a value of the drive control value Y at the end time of the hold period H, that is, a value at the time point the first sharp increase ends.

According to the present embodiment described above, even if the environment temperature of the shape memory alloy 1 changes and the values of Ystart and Ystop change, the change in the differential value Y'0 is relatively small. Accordingly, it is possible to perform a stable determination that is unlikely to be influenced by the environment temperature. For example, in the embodiment 1, when the environment temperature is low, the heating amount necessary for the displacement increases, and Ystop becomes large, so that there is a possibility that the drive control value Y exceeds the threshold value Yth below Xmax. In the present embodiment, because the differential value Y' is used, it is possible to prevent the above erroneous determination.

Besides, in connection with the above description, in the present embodiment, unlike the embodiment 1, it is not necessary to set Yth at a large value for avoidance of an erroneous determination, which accordingly does not raise a problem that the heating amount becomes relatively large until a determination on an increase beyond the threshold value is performed.

As described above, the control circuits 9 in the embodiment 1 and the embodiment 2 achieve the functions with independent circuits; however, it is also possible to achieve these circuits with software processing by the microcomputer 10. Because the target displacement value Xa is given from the microcomputer 10 in a usual application, additional circuits are not necessary as a matter of fact if there are a D/A converter and an A/D converter. Next, an embodiment that achieves the present invention with software processing by the microcomputer 10 is described.

EMBODIMENT 3

3-1. Internal Structure

Because the internal structure is the same as that in the embodiment 1, description of it is skipped.

3-2. Control Circuit Structure

Figure 7:
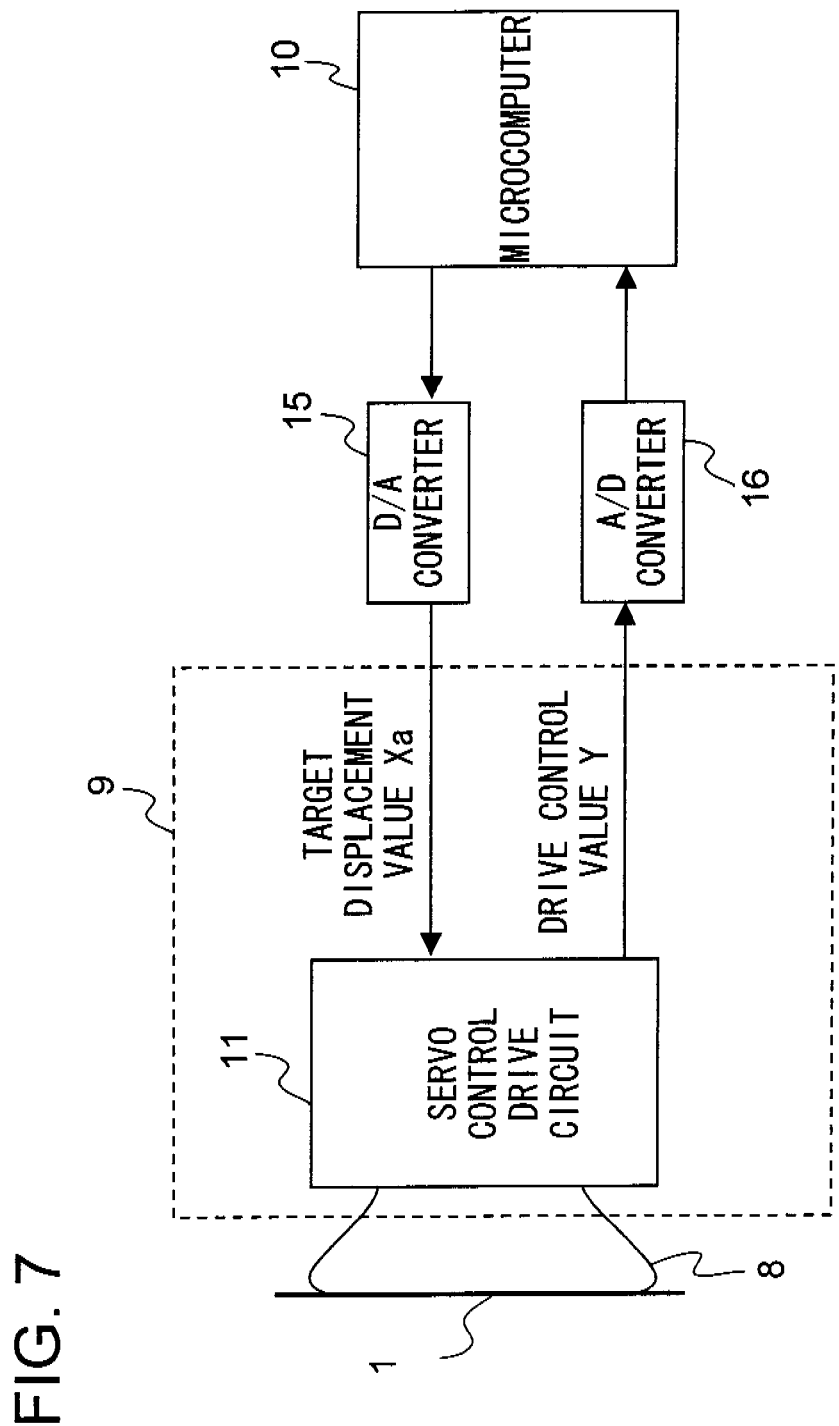
FIG. 7 is a diagram showing a structure of a control circuit according to a third embodiment.

Here, details of the control circuit 9 according to a third embodiment of the present invention are described by using a block diagram in FIG. 7. Here, identical components to those in the embodiment 1 are indicated by identical reference numbers and description of them is skipped.

The control circuit 9 in the present embodiment is composed of only the servo control drive circuit 11 in the embodiment 1. The servo control drive circuit 11 is connected to a D/A converter 15 and an ND converter 16. According to this, the target displacement value Xa is input into the servo control drive circuit 11 from the microcomputer 10 via the D/A converter 15. Besides, the drive control value Y is input into the microcomputer 10 via the A/D converter 16. Here, the microcomputer 10 in the present embodiment achieves the functions of the contact detection portion, the drive limit portion, the target displacement specification portion and the difference calculation portion with software processing.

Operation waveforms of the control circuit 9 having the above structure and the microcomputer 10 are shown in FIG. 8. FIG. 8 (a) shows changes in the target displacement value Xa and the displacement detection value Xb corresponding to the elapse time; and FIG. 8 (b) shows a change in the drive control value Y corresponding to the elapse time. Besides, FIG. 8 (c) shows a change in a difference value Y'' that is a difference between a plurality of drive control values Y (=drive control value $Y_n$ and drive control value $Y_{n-1}$) that are obtained and recorded at every stepwise change.

When the drive process of the movable portion 5 is started, the microcomputer 10, as shown in FIG. 8 (a), changes the target displacement value Xa in a stepwise fashion at every elapse of a predetermined time. The servo control drive circuit 11 that receives the target displacement value Xa via the D/A converter 15 increases the drive control value Y in such a way that the target displacement value Xa and the displacement detection value Xb become equal to each other.

For example, in the example shown in FIG. 8 (a), immediately after the start of the process, the target displacement value Xa changes to $X_1$ in the stepwise fashion. In accordance with this, the servo control drive circuit 11 increases the drive control value Y. As a result of this, the displacement detection value Xb gradually increases to $X_1$. After the displacement detection value Xb becomes equal to $X_1$, the target displacement value Xa further changes to $X_2$ in the stepwise fashion. In accordance with this, the servo control drive circuit 11 further increases the drive control value Y. By repeating this, the displacement detection value Xb is made follow the target displacement value Xa.

Immediately after the stepwise change of the target displacement value Xa, a period during which the drive control value Y changes with a transient response to the servo, that is, a period of an arrow t (hereinafter, called a "setting time t") shown in FIG. 8 (b) exists. After the setting time t elapses after a stepwise change, the microcomputer 10 obtains the drive control value $Y_n$ (n is an integer) via the A/D converter 16. By repeating this, the target displacement value Xa becomes Xmax and the drive control value Y becomes Ystop. At this time point, the movable portion 5 comes into contact with the stopper 7.

Then, as indicated by $X_6$ in FIG. 8 (a), the displacement detection value Xb becomes unable to follow the target displacement value Xa. Here, the servo control drive circuit 11 increases the drive control value Y to Ymax. As a result of this, because the drive control value Y increases sharply, the differential value Y'' increases to Y''max (=maximum differential value). In the example shown in FIG. 8, the difference value Y'' increases to Y''max at the time of $Y_6$ in FIG. 8 (b).

Accordingly, by setting the threshold value Yth under a condition "Ystop<Yth<Ymax" and comparing Y and Yth, it is possible to determine whether the movable portion 5 comes into contact with the stopper 7 or not. Besides, a method is also possible, in which the threshold value Y''th is set under a condition "Y''0<Y''th<Y''max," $Y_1$, $Y_2$ and $Y_3$ . . . are recorded successively, and $Y_n - Y_{n-1}$ (=Y'') and the threshold value Y''th are compared with each other. According to this method, like the embodiment 2, it is possible to perform a stable determination that is not influenced by the environment temperature.

Here, because the drive control value Y is likely to change sharply in the time zone as well in the vicinity of the time the displacement X is 0, the operation of $Y_n - Y_{n-1}$ may be started with a predetermined-time delay after the start of the displacement process. For example, in the example shown in FIG. 8 (c), the operation of $Y_n - Y_{n-1}$ is started from the time point of the operation start ts. Next, a process flow of the above process by the microcomputer 10 is described.

3-3. Process Flow

Figure 9:
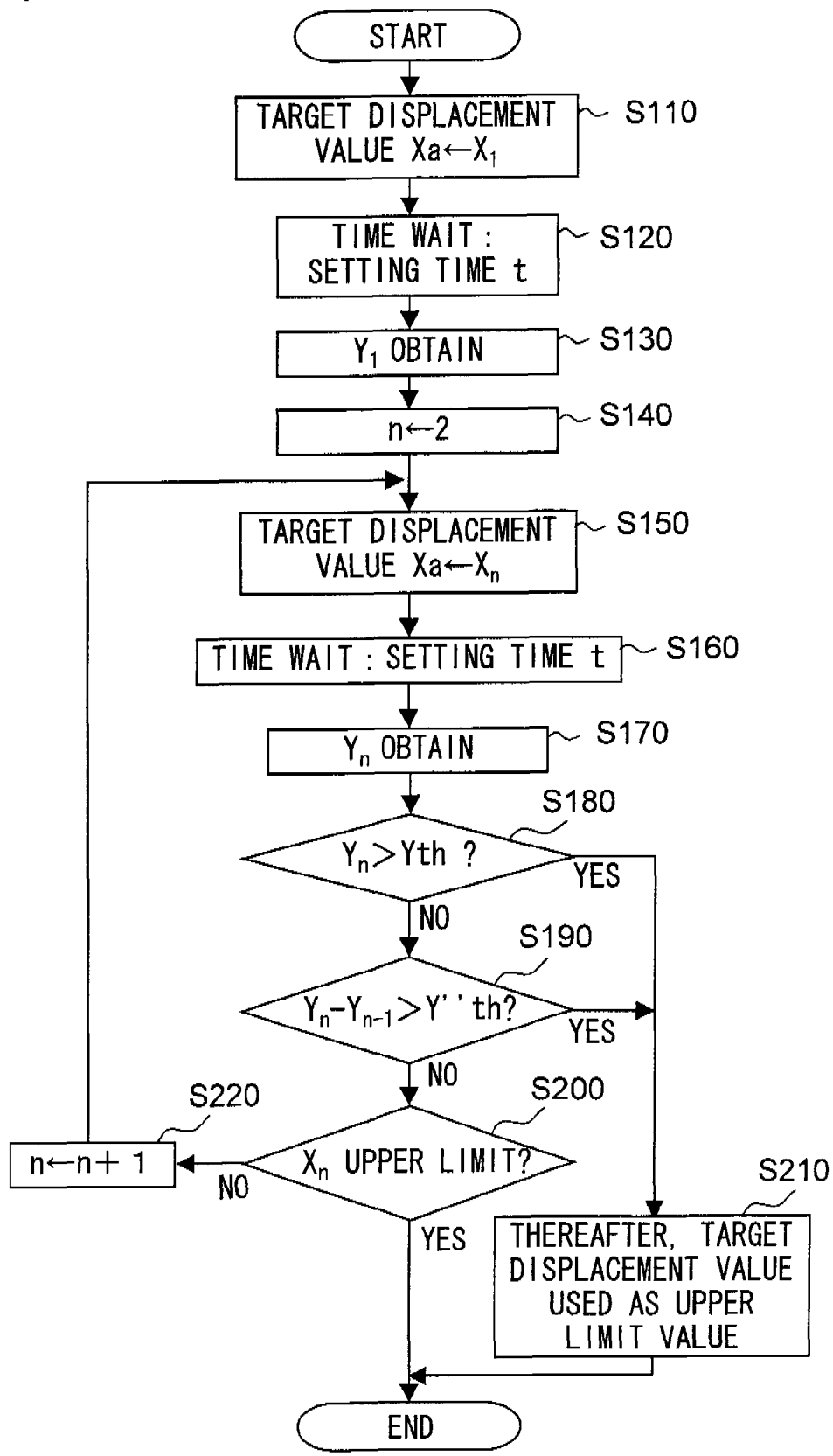
FIG. 9 is a flow chart showing a flow of a limiting process of a target displacement value in the third embodiment.

Here, a process flow of the target displacement value limit process in the third embodiment of the present invention is described by using a flow chart in FIG. 9. The process shown in FIG. 9 is started when an instruction for driving the movable portion 5 is given, for example, at a start time of a power supply of an image take apparatus that includes the shape memory alloy actuator 100, in a time of execution of auto-focusing or the like. Here, the processor for each step shown in FIG. 9 is always the microcomputer 10, and the process is performed by the microcomputer 10 that executes a predetermined program.

After the present process is started, in a step S110, $X_1$ is set to the target displacement value Xa. In this way, the servo control drive circuit 11 performs the servo control based on $X_1$, so that the drive control value Y changes with a transient response to the servo. Then, in a step S120, a time wait is performed for the predetermined setting time t. When the time wait is completed, in a step S130, the drive control value Y is fetched via the A/D converter 16. As a result of this, as shown in FIG. 8 (b), $Y_1$ is obtained as the drive control value Y.

Then, in a step S140, a numeric value 2 is assigned to the variable n that is used for $X_n$ and $Y_n$. And, in a step S150, $X_n$ is set to the target displacement value Xa. Here, $X_n$ is a variable that changes by a predetermined value in proportion to the value of n. Here, because n=2 in the step S140, $Xa=X_n=X_2$.

As a result of this, the target displacement value Y, as shown in FIG. 8 (a), changes from $X_1$ to $X_2$ by one step. After the stepwise increase, in a step S160, the time wait is performed again for the setting time t. When the time wait is completed, in a step S170, the drive control value Y is fetched via the A/D converter 16. As a result of this, as shown in FIG. 8 (b), $Y_2$ is obtained as the drive control value Y.

Then, in a step S180, a determination with a condition "$Y_n$>Yth" is performed. If the above condition is met, the process goes to a step S210 described later. If the above condition is not met, in a step S190, a determination with a condition "$Y_n-Y_{n-1}$>Y"th" is performed. If the above condition is met, the process goes to the step S210.

In the step S210, $X_{n-1}$ is set as the upper limit value of the target displacement value Xa. For example, in the example shown in FIG. 8, the "$Y_n$>Yth" is met when n=6. Accordingly, $X_5$ is set as the upper limit value of the target displacement value Xa and the drive range is limited. If the drive range is limited, the present process flow ends.

Back again to the step S190 for description, if the condition "$Y_n-Y_{n-1}$>Y"th" is not met, in the step S200, it is determined whether the value of $X_n$ is the maximum displacement controllable by the servo control drive circuit 11 or not. Incidentally, the maximum displacement described here indicates a displacement that corresponds to the maximum value of resistance values that are detectable by the resistance value detection portion (not shown) which the servo control drive circuit 11 includes. Accordingly, the microcomputer 10 also is designed in advance not to give a displacement equal to or larger than the maximum displacement as the target displacement value Xa.

If it is determined to be the maximum displacement, the present process flow ends. If it is determined not to be the maximum displacement, after 1 is added to the value of the variable n in a step S220, the process returns to the step S150 to be continued. Here, after the present process described above ends, in a practical operation, adjustment and the like of the drive control value is performed in such a way that the displacement falls in the above limited range. However, because the process itself is the same as the conventional technology, description of the process is skipped here.

Here, the limit process of the target displacement value shown in FIG. 9 may be performed every time the auto-focusing is executed, or may be performed only once at the start time of the power supply, and the process result may be recorded into a memory or the like and thereafter only reference thereto may be performed.

OTHER EMBODIMENTS

The present invention is described above by using the preferred embodiments and examples; however, the present invention is not limited to the above embodiments and examples, and may be modified in various ways and put into practical use within the scope of the technical concept.

For example, in the above embodiments, the target displacement value Xa at which the movable portion 5 comes into contact with the stopper 7 is detected; however, as an application development of this technology, it is also possible to use this detection result to decide on the standby position of the movable portion 5. Incidentally, the standby position described here indicates a position of the movable portion 5 in a state in which the power supply of the image take apparatus is started and an operation command from a user is waited for.

Specifically, a difference between the target displacement value (=second target displacement value) corresponding to the position desired for a standby for and the displacement (=first target displacement) at which the movable portion 5 is assumed to come into contact with the stopper 7 in a standard temperature environment is obtained and recorded into a record portion (=difference record portion) such as a memory or the like. And, when contact between the movable portion 5 and the stopper 7 is detected by the methods in the embodiments 1 to 3, the recorded difference is subtracted from the displacement (=reference displacement) at the time of the contact detection. In this way, it is possible to move the movable portion 5 to the standby position with respect to the position of the stopper 7.

By using this method, even in a case where the absolute displacement changes because of temperature change, time-dependent change and the like of the shape memory alloy 1, it is possible to decide on the standby position of the movable portion 5 relatively correctly. In this way, because the standby position does not change depending on the environment and situation, the user does not need to perform a fine adjustment of the focus depending on the change of the standby position. Accordingly, it is possible to raise the operability and convenience.

The invention claimed is:
1. A shape memory alloy drive device that has a drive control portion which is given a target displacement value, displaces the shape memory alloy to the target displacement value as a target by applying a voltage or a current to the shape memory alloy, thereby performing drive control of a movable portion that is connected to the shape memory alloy, the shape memory alloy drive device comprising:
   a contact detection portion that, based on a change in a drive control value which indicates a magnitude of the voltage or the current applied by the drive control portion, determines whether the movable portion is in contact with a stationary mechanism or not; and a drive limit portion that limits an upper limit of the target displacement value given to the drive control portion if contact is detected based on a determination result from the contact detection portion, wherein the contact detection portion sets a reference drive value between a first drive control value that is a drive control value at which the movable portion and the stationary portion are assumed to come into contact with each other and a second drive control value that is a maximum drive control value controllable by the drive control portion; and determines that the movable portion comes into contact with the stationary mechanism if the drive control value of the drive control portion exceeds the reference drive value.

2. A shape memory alloy drive device that has a drive control portion which is given a target displacement value, displaces the shape memory alloy to the target displacement value as a target by applying a voltage or a current to the shape memory alloy, thereby performing drive control of a movable portion that is connected to the shape memory alloy, the shape memory alloy drive device comprising:

a contact detection portion that, based on a change in a drive control value which indicates a magnitude of the voltage or the current applied by the drive control portion, determines whether the movable portion is in contact with a stationary mechanism or not;

a drive limit portion that limits an upper limit of the target displacement value given to the drive control portion if contact is detected based on a determination result from the contact detection portion; and a differential portion that time-differentiates the drive control value from the drive control portion and gives the calculated differential value to the contact detection portion, wherein the contact detection portion sets a value which is lower than a maximum differential value that is a differential value at which the drive control value is changed largest by the drive control portion, as a reference differential value; and determines that the movable portion comes into contact with the stationary mechanism if the differential value given from the differential portion exceeds the reference differential value.

3. A shape memory alloy drive device that has a drive control portion which is given a target displacement value, displaces the shape memory alloy to the target displacement value as a target by applying a voltage or a current to the shape memory alloy, thereby performing drive control of a movable portion that is connected to the shape memory alloy, the shape memory alloy drive device comprising:

a contact detection portion that, based on a change in a drive control value which indicates a magnitude of the voltage or the current applied by the drive control portion, determines whether the movable portion is in contact with a stationary mechanism or not;

a drive limit portion that limits an upper limit of the target displacement value given to the drive control portion if contact is detected based on a determination result from the contact detection portion; and a target displacement specification portion that changes the target displacement value of the shape memory alloy in a stepwise fashion and gives the changed target displacement value to the drive limit portion, wherein the contact detection portion sets a reference drive value between a first drive control value at which the movable portion and the stationary mechanism are assumed to come into contact with each other and a second drive control value that is a maximum drive control value controllable by the drive control portion; compares the drive control value after an elapse of a setting time and the reference drive value when the drive control value from the drive control portion changes in response to a change in the target displacement value from the target displacement specification portion; and determines that the movable portion comes into contact with the stationary mechanism if the drive control value exceeds the reference drive value.

4. A shape memory alloy drive device that has a drive control portion which is given a target displacement value, displaces the shape memory alloy to the target displacement value as a target by applying a voltage or a current to the shape memory alloy, thereby performing drive control of a movable portion that is connected to the shape memory alloy, the shape memory alloy drive device comprising:

a contact detection portion that, based on a change in a drive control value which indicates a magnitude of the voltage or the current applied by the drive control portion, determines whether the movable portion is in contact with a stationary mechanism or not;

a drive limit portion that limits an upper limit of the target displacement value given to the drive control portion if contact is detected based on a determination result from the contact detection portion;

a target displacement specification portion that changes the target displacement value of the shape memory alloy in a stepwise fashion and gives the changed target displacement value to the drive control portion; and a difference calculation portion that records the drive control value after an elapse of a setting time when the drive control value from the drive control portion changes in response to a change in the target displacement value from the target displacement specification portion; and calculates a difference value between the drive control value at a time of the recording and the drive control value at a previous recoding time, wherein the contact detection portion sets a value, which is lower than a maximum difference value that is a difference value at which the drive control value is changed largest by the drive control portion, as a reference difference value; and determines that the movable portion comes into contact with the stationary mechanism if the difference value given from the difference calculation portion exceeds the reference difference value.

5. A shape memory alloy drive device that has a drive control portion which is given a target displacement value, displaces the shape memory alloy to the target displacement value as a target by applying a voltage or a current to the shape memory alloy, thereby performing drive control of a movable portion that is connected to the shape memory alloy, the shape memory alloy drive device comprising:

a contact detection portion that, based on a change in a drive control value which indicates a magnitude of the voltage or the current applied by the drive control portion, determines whether the movable portion is in contact with a stationary mechanism or not;

a drive limit portion that limits an upper limit of the target displacement value given to the drive control portion if contact is detected based on a determination result from the contact detection portion; and a difference record portion that records a difference between a first target displacement value at which the movable portion and the stationary mechanism are assumed to come into contact with each other and a second target displacement value for moving the movable portion to a predetermined standby position, wherein a displacement at which contact between the movable portion and the stationary mechanism is detected by the contact detection portion is used as a reference displacement, and a target displacement value of the standby position is decided on based on the reference displacement and the difference recorded in the difference record portion.

6. The shape memory alloy drive device according to claim 1, further comprising a displacement detection portion that detects a displacement that occurs in the shape memory alloy,
wherein the drive control portion performs control to change the drive control value in such a way that the displacement obtained by the displacement detection portion becomes equal to the target displacement value.

7. The shape memory alloy drive device according to claim 1, further comprising
a difference record portion that records a difference between a first target displacement value at which the movable portion and the stationary mechanism are assumed to come into contact with each other and a second target displacement value for moving the movable portion to a predetermined standby position,
wherein a displacement at which contact between the movable portion and the stationary mechanism is detected by the contact detection portion is used as a reference displacement, and a target displacement value of the standby position is decided on based on the reference displacement and the difference recorded in the difference record portion.

8. The shape memory alloy drive device according to claim 2, further comprising
a difference record portion that records a difference between a first target displacement value at which the movable portion and the stationary mechanism are assumed to come into contact with each other and a second target displacement value for moving the movable portion to a predetermined standby position,
wherein a displacement at which contact between the movable portion and the stationary mechanism is detected by the contact detection portion is used as a reference displacement, and a target displacement value of the standby position is decided on based on the reference displacement and the difference recorded in the difference record portion.

9. The shape memory alloy drive device according to claim 3, further comprising
a difference record portion that records a difference between a first target displacement value at which the movable portion and the stationary mechanism are assumed to come into contact with each other and a second target displacement value for moving the movable portion to a predetermined standby position,
wherein a displacement at which contact between the movable portion and the stationary mechanism is detected by the contact detection portion is used as a reference displacement, and a target displacement value of the standby position is decided on based on the reference displacement and the difference recorded in the difference record portion.

10. The shape memory alloy drive device according to claim 4, further comprising
a difference record portion that records a difference between a first target displacement value at which the movable portion and the stationary mechanism are assumed to come into contact with each other and a second target displacement value for moving the movable portion to a predetermined standby position,
wherein a displacement at which contact between the movable portion and the stationary mechanism is detected by the contact detection portion is used as a reference displacement, and a target displacement value of the standby position is decided on based on the reference displacement and the difference recorded in the difference record portion.

11. The shape memory alloy drive device according to claim 2, further comprising a displacement detection portion that detects a displacement that occurs in the shape memory alloy,
wherein the drive control portion performs control to change the drive control value in such a way that the displacement obtained by the displacement detection portion becomes equal to the target displacement value.

12. The shape memory alloy drive device according to claim 3, further comprising a displacement detection portion that detects a displacement that occurs in the shape memory alloy,
wherein the drive control portion performs control to change the drive control value in such a way that the displacement obtained by the displacement detection portion becomes equal to the target displacement value.

13. The shape memory alloy drive device according to claim 4, further comprising a displacement detection portion that detects a displacement that occurs in the shape memory alloy,
wherein the drive control portion performs control to change the drive control value in such a way that the displacement obtained by the displacement detection portion becomes equal to the target displacement value.

14. The shape memory alloy drive device according to claim 5, further comprising a displacement detection portion that detects a displacement that occurs in the shape memory alloy,
wherein the drive control portion performs control to change the drive control value in such a way that the displacement obtained by the displacement detection portion becomes equal to the target displacement value.

15. The shape memory alloy drive device according to claim 7, further comprising a displacement detection portion that detects a displacement that occurs in the shape memory alloy,
wherein the drive control portion performs control to change the drive control value in such a way that the displacement obtained by the displacement detection portion becomes equal to the target displacement value.

16. The shape memory alloy drive device according to claim 8, further comprising a displacement detection portion that detects a displacement that occurs in the shape memory alloy,
wherein the drive control portion performs control to change the drive control value in such a way that the displacement obtained by the displacement detection portion becomes equal to the target displacement value.

17. The shape memory alloy drive device according to claim 9, further comprising a displacement detection portion that detects a displacement that occurs in the shape memory alloy,
wherein the drive control portion performs control to change the drive control value in such a way that the displacement obtained by the displacement detection portion becomes equal to the target displacement value.

18. The shape memory alloy drive device according to claim 10, further comprising a displacement detection portion that detects a displacement that occurs in the shape memory alloy, wherein the drive control portion performs control to change the drive control value in such a way that the displacement obtained by the displacement detection portion becomes equal to the target displacement value.

* * * * *